United States Patent
Singh et al.

(10) Patent No.: US 12,130,925 B2
(45) Date of Patent: Oct. 29, 2024

(54) SYSTEM AND METHOD FOR FLEXIBLE STARTUP OF DATA PROCESSING SYSTEMS

(71) Applicant: Dell Products L.P., Round Rock, TX (US)

(72) Inventors: Sanjeev Singh, Cedar Park, TX (US); Paul W. Vancil, Austin, TX (US); Mukund Khatri, Austin, TX (US); Prashanth Giri, Round Rock, TX (US); Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 17/873,364

(22) Filed: Jul. 26, 2022

(65) Prior Publication Data
US 2024/0037237 A1 Feb. 1, 2024

(51) Int. Cl.
*G06F 21/57* (2013.01)
*G06F 9/4401* (2018.01)
*G06F 11/22* (2006.01)

(52) U.S. Cl.
CPC .......... *G06F 21/572* (2013.01); *G06F 9/4401* (2013.01); *G06F 11/2284* (2013.01); *G06F 2221/033* (2013.01)

(58) Field of Classification Search
CPC .. G06F 21/572; G06F 9/4401; G06F 11/2284; G06F 2221/033; G06F 9/45541; G06F 21/575
See application file for complete search history.

(56) References Cited

U.S. PATENT DOCUMENTS

| | | | |
|---|---|---|---|
| 9,223,982 B2 | 12/2015 | Adams et al. | |
| 9,830,457 B2 | 11/2017 | Vidyadhara et al. | |
| 10,599,849 B2 | 3/2020 | Nijhawan et al. | |
| 11,416,615 B2 | 8/2022 | Hayes et al. | |
| 11,500,994 B2 | 11/2022 | Khatri et al. | |
| 11,698,969 B1* | 7/2023 | Henriquez Garcia | G06F 21/572 726/23 |
| 2022/0092203 A1 | 3/2022 | Khatri et al. | |
| 2024/0037239 A1* | 2/2024 | Liu | G06F 21/575 |

OTHER PUBLICATIONS

"UEFI Secure Boot Customization", National Security Agency Cybersecurity Technical Report, U/OO/168873-20 I pp. 20-0652, Sep. 2020. 39 pages.

* cited by examiner

*Primary Examiner* — Baotran N To
(74) *Attorney, Agent, or Firm* — Womble Bond Dickinson (US) LLP

(57) ABSTRACT

Methods and systems for managing the operation of data processing systems are disclosed. A data processing system may include a computing device that may enter various operating states by performing various types of startups. The startups may include use of code bases for which the computing device may not inherently be able to validate. To reduce risk of using the code bases, the computing device may perform processes to validate the code bases prior to using the code bases. Additionally, the computing devices may limit the types of interfaces that may be established during the startups while allowing other types of interfaces to be established to provide startup flexibility.

20 Claims, 8 Drawing Sheets

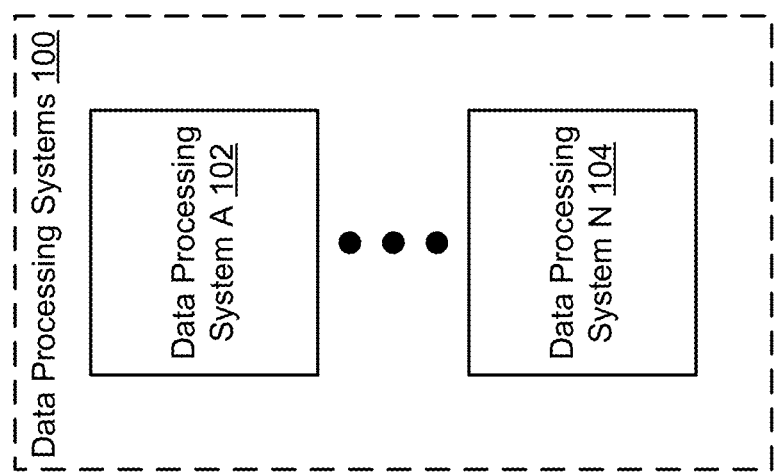

SYSTEM AND METHOD FOR FLEXIBLE STARTUP OF DATA PROCESSING SYSTEMS

FIELD OF THE EMBODIMENTS

Embodiments disclosed herein relate generally to device management. More particularly, embodiments disclosed herein relate to systems and methods to manage security and performance of startup processes.

BACKGROUND

Computing devices may store data and used stored data. For example, computing devices may utilize data when providing computer implemented services. If computing devices are unable to access data, the computing devices may be unable to provide some, or all, of the computer implemented services that they are able to provide with access to data.

BRIEF DESCRIPTION OF THE DRAWINGS

Embodiments are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
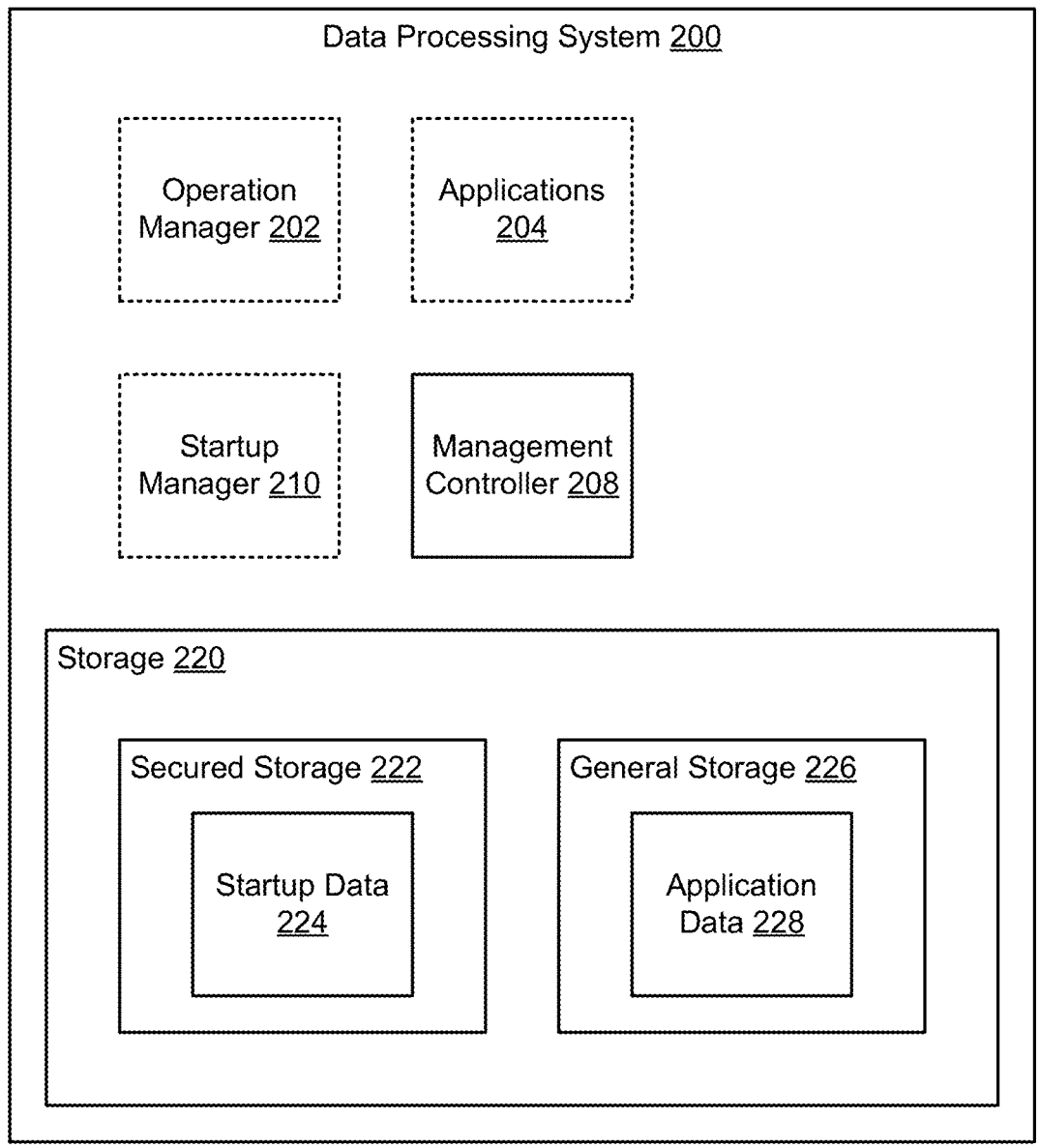
FIG. 2A shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing system. A data processing system may include a computing device that may operate in various manners (e.g., operating states or modes). The data processing system may perform different startups (e.g., one or more actions) to enter respective operating states.

To provide flexibility in the operation of data processing systems, some startups may allow use of code bases (e.g., images of firmware, applications, etc.) during the startups that are not stored in secure storage and/or may not be validated using information available to the data processing system. This may present risk to the data processing system.

To manage the risk presented by these startup, a data processing system in accordance with embodiments disclosed herein may perform startups that include validation processes for code used during the startups. For example, code corresponding to firmware used during the startups may be subject to validation prior to execution of the firmware.

To validate the firmware in a computationally efficient manner, a hash of a known-good copy of the firmware may be used to check an alleged good copy of the firmware which may be obtained from a trusted entity. For example, during a portion of startup that is secure, a hash for the firmware used later during the startup may be retrieved from a management controller hosted by the data processing system. Later during the startup, a copy of the firmware that is believed to be (but may not be) valid (e.g., conform to an expectation) may be checked using the hash. For example, a hash of the obtained copy of the firmware may be calculated and compared to the previously obtained hash. The copy of the firmware may be treated as being valid if the hashes match.

By doing so, embodiments disclosed herein may provide flexibility for a range of different types of startups that may use various code bases which may or may not be pre-validated. Thus, a data processing system in accordance with embodiments disclosed herein may provide additional capabilities through flexibility during startup.

Additionally, to reduce risk presented by certain interfaces, the startup processes disclosed herein may limit instantiation of interfaces until the startup is complete. For example, interfaces that may be used to attached external media to a data processing system may be prevented until after startup is complete. To provide flexibility under these conditions, interfaces to management controllers or other hosted entities that may not present significant risk of introduction of malicious code may be enable to allow for various code bases to be introduced during the startups. By doing so, risk presented by certain types of interfaces may be limited while still providing flexibility in use of various code bases during the startups.

In an embodiment, a computer-implemented method for managing operation of a data processing system is provided. The method may include identifying a startup of the data processing system; after a unified extensible firmware interface (UEFI) compliant startup manager finishes a power-on self-test (POST) portion of the startup: making a determination regarding whether the startup is a UEFI compliant startup; in an instance of the determination in which the startup is not a UEFI compliant startup: obtaining a non-UEFI compliant firmware image from a management controller hosted by the data processing system; making a second determination regarding whether the non-UEFI compliant firmware image is trustworthy; and in a first instance of the second determination in which the non-UEFI compliant firmware image is trustworthy: handing off management of the startup to an instance of a non-UEFI compliant firmware hosted by the data processing system using the non-UEFI compliant firmware image to complete the startup; and in a second instance of the second determination in which the non-UEFI compliant firmware image is not trustworthy: remediating the startup without using the non-UEFI compliant firmware image to complete the startup.

Obtaining the non-UEFI compliant firmware image from the management controller may include sending a request for the non-UEFI compliant firmware image to the management controller via a high speed bare metal interface; and receiving a copy of the non-UEFI compliant firmware image via a message responsive to the request and obtained via the high speed bare metal interface.

The high speed bare metal interface may be a shared memory architecture (SMA) or a memory mapped management controller interface. A bare metal interface may not use layers of abstraction and/or virtualization through which communications are sent and/or received (e.g., in contrast to an emulated communication interface, such as an emulated universal serial bus interface which may include a layer of abstraction that allows hardware that would otherwise not operate in a manner consistent with the universal serial bus interface specification to be interfaced with using the universal serial bus interface).

The non-UEFI compliant firmware image may be executed prior to any operating systems being executed by the data processing system.

The high speed bare metal interface may be implemented without emulation.

The computer-implemented method may also include, in a second instance of the determination in which the startup is a UEFI compliant startup: obtaining UEFI compliant firmware; and initiating execution of the UEFI compliant firmware during the startup.

The second determination may be made using security information corresponding to the non-UEFI compliant firmware image and by, at least in part, performance of an operation using the non-UEFI compliant firmware image, the operation having been used to obtain the security information.

Remediating the startup may include at least one action selected from a group of actions consisting of: halting the startup; displaying an error with respect to the startup; and performing a recovery for the data processing system.

The management controller may operate independently from hardware components of the data processing system used to provide computer implemented offered by the data processing system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include one or more data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may host applications that provide these (and/or other) computer implemented services. The applications (or other types of executing entities) may presume (and/or may require for proper operation of the applications) that a data processing system hosting the application is operating in a predetermined manner. The predetermined manner of operation may include, for example, executing an operating system, drivers, and/or other type of management entities that mediate, facilitate, or otherwise operate in a manner which enables the applications to operate (e.g., by providing abstracted access to hardware resources used in the execution of the applications).

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation management of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the data processing system.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system or other type of management entity). To enter the predetermine manner of operation conducive to execution of the application, the data processing system may go through a boot process (e.g., a startup) which may be performed by one or more types of management entity such as a basic input-output system and/or other startup management entities. The management entity may perform any number of actions (e.g., a "startup process") to prepare the data processing system to begin execution of an operating system or other type of management entity that facilitates execution of applications (and/or operation of certain types of hardware devices such as application specific integrated circuits that may provide certain functions without need for a software layer).

These actions may include, for example, inventorying the hardware components hosted by a host device, loading drivers or other software components, configuring hardware and/or software components, etc. As part of the startup process, the management entity may also load code, configuration settings, and/or other data corresponding to an operating system (and/or other management entity types and/or other types of executing entities) to memory. This and/or other types of data may be stored in persistent storage thereby allowing it to be read into memory during the startup.

Once the data is loaded into memory, the data processing system may initiate execution of code (e.g., computer instructions) included in the data in memory to begin operation of the operating system or other types of management entities. The executing code may utilize configuration settings and/or other information also included in the data in memory.

After the data processing system hosts the operating system and/or perform other types of predetermined operations as part of a startup, discussed above, then the applications may begin to provide the computer implemented services. Depending on how a user may desire the data processing system to function, various type of startup processes may be performed.

For example, data processing systems 100 may be capable of performing multiple types of startup processes each leading to different predetermined operating state conducive to different use cases for data processing systems 100. Each of these startup processes may utilize, for example, similar and/or different code bases to drive the startup processes. For example, data processing systems 100 may be capable of performing a first type of startup process utilizing a first code base and a second type of startup process utilizing a second code base. Additionally, to provide flexibility in the startup process, data processing systems 100 may be capable of performing customized startup processes using various code bases that may be specified by a user.

However, the aforementioned flexibility provided by the data processing systems may also result in risk to the data processing systems. For example, to perform a customized startup process, data processing systems 100 may utilize various portions of computer code (e.g., firmware, management entity images, etc.) that may not be in a known good state or may be stored in storages that may not be secure. For example, as part of a startup process, code bases may be stored in locations such as universal serial bus (USB) accessible storage. To access these storage locations, a data processing system may need to make these storage locations access. However, malicious code may be present in these other storage locations. Thus, making these other storages accessible during startup may present risk to the data processing system.

Generally, data processing systems 100 may include functionality to secure and validate code bases for standardized startup processes (e.g., using data stored on a secured storage such as a flash storage accessible by a processor, and the secure storage may include signatures or other types of cryptographic information usable to validate that the data in the secure storage is known to be good or at least in a known state acceptable for use by a data processing system to perform a startup). Consequently, use of data from the secure storage, rather than from other storages that may be accessed for customized/flexible startups, may have a substantially lower associated risk profile.

In contrast to the data stored in secure storage, during a customized startup process, data processing system 100 may utilize code bases and/or portions of code that are in an indeterminate state of validation. Consequently, if a data processing system performs a startup using these code bases and/or portions of code, then the data processing system may risk being compromised.

For example, a malicious party may insert malicious code into the code bases and/or portions of code that may make the data processing systems vulnerable. If used during a startup, the malicious code may cause the data processing system to enter an undesired operating state in which it may be vulnerable to the malicious party (e.g., the malicious party may commandeer the data processing system, may obtain data from the data processing system that the malicious party may otherwise be unable to access, etc.).

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may be capable of performing various types of startups including flexible startups, as discussed above.

To manage risk in the performance of flexible startups, data processing systems 100 may include functionality to (i) validate code bases and/or portions of code used during startups including flexible startup, (ii) prevent performance of startups that may rely on code bases and/or portions of code that cannot be validated, and (iii) obtain code bases and/or portions of code bases after completion of a power-on self-test (POST) from a management controller using a bare metal interface. Through use of the bare metal interface to the management controller, the data processing system may access code-bases that are not stored in secure storage without exposing the data processing system to additional risk presented by other types of interfaces during startup. By doing so, a data processing system in accordance with embodiments disclosed herein may provide both startup flexibility while managing risks associated with flexible startups.

To validate code bases, data processing systems 100 may perform a computationally efficient process for validating the code bases and/or portions of code. To do so, data processing systems 100 may (i) during a secure portion of a startup, obtain security information for code bases and/or portions of code that may be used during an unsecured portion of the startup, (ii) obtain the code bases and/or portions of code, (iii) perform a validation for the code bases and/or the portions of code using the security information, and/or (iv) reject or allow use of the code bases and/or the portions of code for the startup depending on whether the code bases and/or the portions of code are successfully validated.

Data processing systems 100 may defer obtaining the code bases and/or the portions of code until after a unified extensible firmware interface (UEFI) compliant startup manager of the data processing systems completes a POST during the startup. By doing so, the portion of the startup process until completion of the POST may generally be secured through (i) use of code bases that are validated and stored in secure storage, and (ii) limiting the interfaces made available during the startup. For example, throughout the startup until handoff, universal serial bus (USB) interfaces (emulated and/or native) may not be established thereby limiting risk inherent in those types of interfaces (e.g., if a USB interface is present, malicious code may be used during the startup).

Any of data processing systems 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4. For additional details regarding data processing systems 100, refer to FIG. 2A.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

Turning to FIG. 2A, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may perform various types of startups to enter predetermined operating states.

To perform secured startups, data processing system 200 may host startup data 224 stored in secured storage 222 of storage 220. Startup data 224 may include, for example, code bases, configuration settings, cryptographic data, and/or other types of information usable to both validate startup data 224 and perform one or more types of startups.

For example, startup data 224 may include a code base that conforms to the unified extensible firmware interface (UEFI) specification. Consequently, if a startup is performed using startup data 224, then the startup process may utilize UEFI compliant code such as firmware, drivers, etc.

However, to provide flexibility in startup, other code bases may be used. The other code bases may not comply with the UEFI specification. For example, the non-UEFI compliant code bases may include non-UEFI compliant firmware. The other code bases may not be stored in secured storage 222. By being stored elsewhere (e.g., in a remote location, on an onboard management controller, e.g., 208, in an emulated device, etc.), the other code bases may need to be validated prior to use during startup.

The startup performed using the code base in startup data 224 or other code bases stored elsewhere may result in startup manager 210 (e.g., a basic input output system or similar type of entity) being instantiated during the startup. Startup manager 210 may manage performance of the startup. As part of managing the performance of the startup, startup manager 210 may ascertain whether the startup being performed is a secured startup using startup data 224 and UEFI compliant firmware, or is a flexible startup using, at least in part, other code bases and non-UEFI compliant firmware.

If the startup is a flexible startup, then startup manager 210 may perform validations for the code base used in the flexible startup that are note pre-validated and/or stored in secure storage 222. To do so, startup manager 210 may communicate with management controller 208 and/or other devices. Management controller 208 or other devices may store security information for the other code bases and/or the other code bases (or portions thereof).

Once a startup is complete, operation manager 202 may generally manage the operation of data processing system 200. Operation manager 202 may include, for example, an operating system, drivers, and/or other types of management entities. Operation manager 202 may use various firmware deployed by startup manager 210 during a startup. Depending on its type of management entity, operation manager 202 may rely on non-UEFI firmware or UEFI firmware/drivers deployed with the UEFI firmware.

The function of operation manager 202 may change (and the components of operation manager 202) depending on the type of startup performed. Consequently, the operation of data processing system 200 post startup may be customized by performed different types of startups.

Applications 204 may provide desired computer implemented services. When doing so, applications 204 may generate, store, modify, read, and/or otherwise use application data 228 stored in general storage 226. Applications 204 may only be present after certain types of startups are performed that cause operation manager 202 to provide certain functionalities (e.g., such as that of an entity capable of supporting the operation of various applications).

Generally, operation manager 202 and applications 204 may provide their functionalities while data processing system 200 operates in the predetermined manner. For example, prior to completion of a startup, operation manager 202 and applications 204 may not provide their respective functionalities (they may not be executing). In FIG. 2A, operation manager 202, applications 204, and startup manager 210 are illustrated with dashed outline because these entities may or may not be executing depending on whether a startup is being performed (e.g., only startup manager 210 may be executing) or a startup is completed (e.g., operation manager 202 and applications 204 may be executing, startup manager 210 may or may not be executing).

Startup manager 210 may provide startup management functionality. Startup management functionality may include selectively performing different types of startups using startup data 224 and/or other code bases which may be hosted by management controller 208. Additionally, startup manager 210 may restrict certain types of startups from being performed depending on whether the code bases used in the types of startups can be validated.

In an embodiment, one or more of operation manager 202, applications 204, and startup manager 210 are implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 202, applications 204, and startup manager 210. One or more of operation manager 202, applications 204, and startup manager 210 may be implemented using other types of hardware devices without departing from embodiments disclosed herein.

In an embodiment, one or more of operation manager 202, applications 204, and startup manager 210 is implemented using a processor adapted to execute computing code stored on a persistent storage that when executed by the processor performs the functionality of one or more of operation manager 202, applications 204, and startup manager 210 discussed throughout this application. The processor may be a hardware processor including circuitry such as, for example, a central processing unit or a microcontroller. The processor may be other types of hardware devices for processing digital information without departing from embodiments disclosed herein.

Figure 3A:
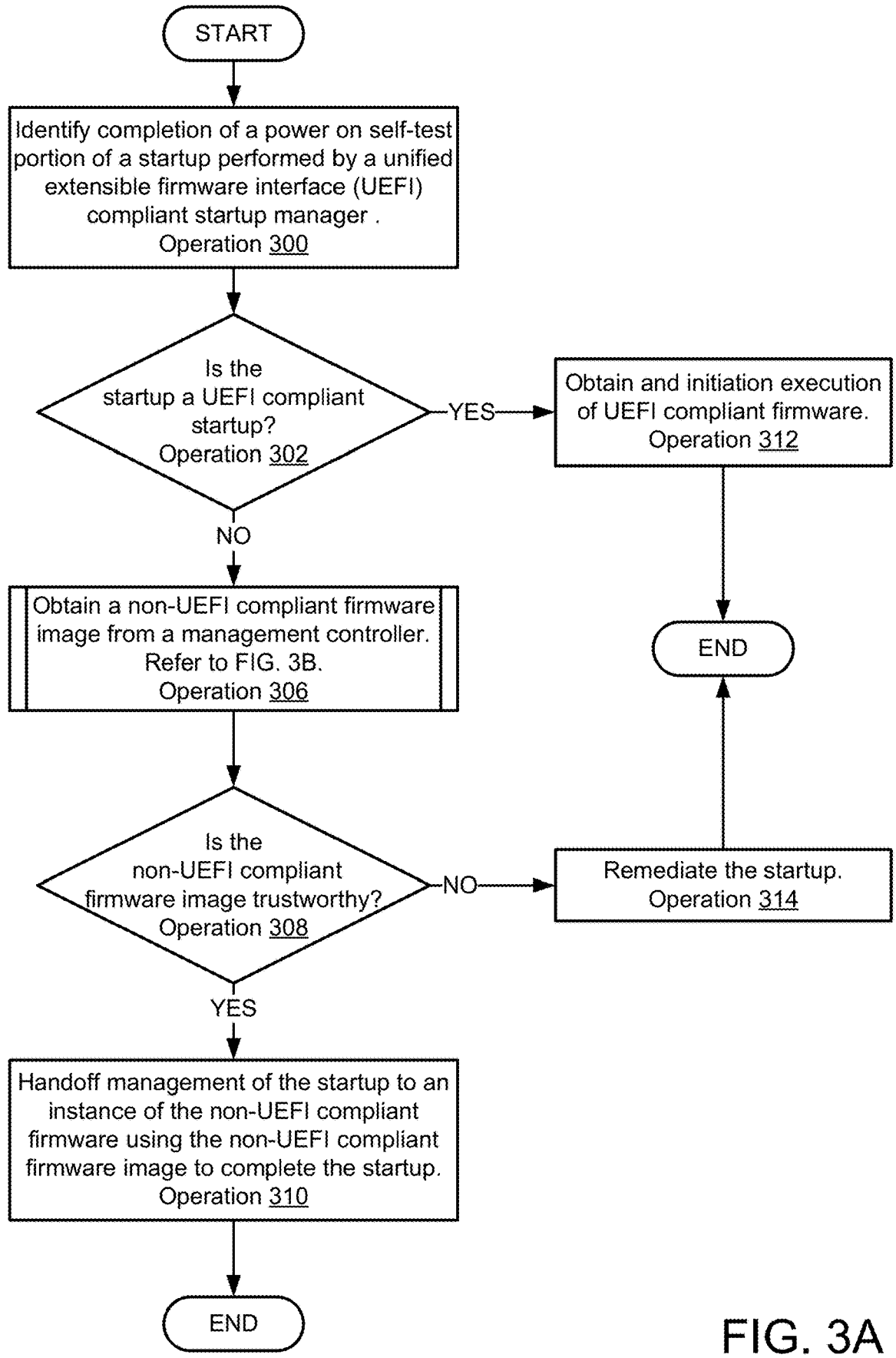
FIG. 3A shows a flow diagram illustrating a method of managing startups of a data processing system in accordance with an embodiment.
Figure 3B:
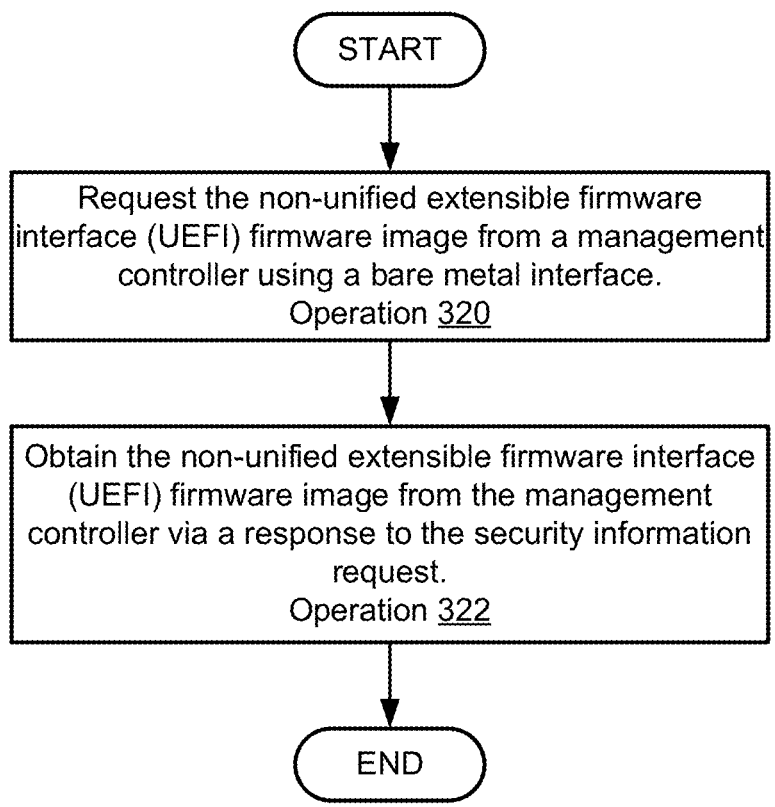
FIG. 3B shows a flow diagram illustrating a method of obtaining firmware during a startup of a data processing system in accordance with an embodiment.

When providing their functionalities, one or more of operation manager 202, applications 204, and startup manager 210 may perform all, or a portion, of the methods illustrated in FIGS. 3A-3B.

Management controller 208 may provide startup management services. Startup management services may include (i) providing security information to startup manager 210 during startups, and/or (ii) providing code bases, or portions thereof, configuration settings, and/or other types of data usable to perform a flexible startup. By doing so, management controller 208 may allow for data processing system 200 to perform flexible startups and validate whether the code bases (and/or other data) used to perform the flexible startups is known to be good (or at least in a known state). Consequently, administrators or other persons tasked with managing data processing system 200 may be able to cause data processing system 200 to enter particular operating states.

Additionally, prior to completion of a startup, management controller 208 may be operably connected to a processor hosting startup manager 210 via a bare metal interface. The bare metal interface may facilitate transfer of a code base stored in the management controller to the processor. Consequently, startup manager 210 may obtain the code base while USB interfaces (e.g., emulated or physical) or other interfaces that may present risk to the startup are not operational.

For example, to communicate with startup manager 210, management controller may implement and/or be connected to a processor executing code for startup manager 210 via an interface such as a shared memory interface (SMA), an intelligent platform management interface (IPMI), a memory mapped management controller interface, or another type of interface that may not present risk to the startup. Various commands for these interfaces may be invoked by startup manager 210 and/or management controller 208 to communicate with one another.

In an embodiment, management controller 208 is implemented with an in band and/or out of band management controller hosted by data processing system 200. For example, management controller 208 may be implemented with a separate, independently operating computing device operably connected to the components (e.g., processors, memory modules, storage devices, etc.) of data processing system 200 via one or more communication interfaces (e.g., SMA, IPMI). The one or more communication interfaces may allow management controller 208 to communication with startup manager 210 and/or other entities hosted by data processing system 200 during and/or after startups are performed.

In an embodiment, management controller 208 implements a secured communication system. The secured communication systems may limit the types of communications, quantities of communications, formats of communications, and/or other aspects of communication between management controller 208 and startup manager 210. For example, management controller 208 may implement a mailbox system or other type of virtualized (or software defined) communication end point scheme such that management controller 208 may appear to be a separate device to data processing system 200 (and/or other entities such as, for example, authorization system 120). To communicate with management controller 208, startup agent 206 and/or other entities may send communications to an end point associated with management controller 208.

Management controller 208 may operate independently of data processing system 200 and/or invoke various functionalities of data processing system 200 to provide all, or a part, of its functionality. For example, to communicate with other devices, management controller 208 may utilize communication hardware of data processing system 200 (e.g., by relaying communications through operation manager 202 or startup manager 210).

Figure 2B:
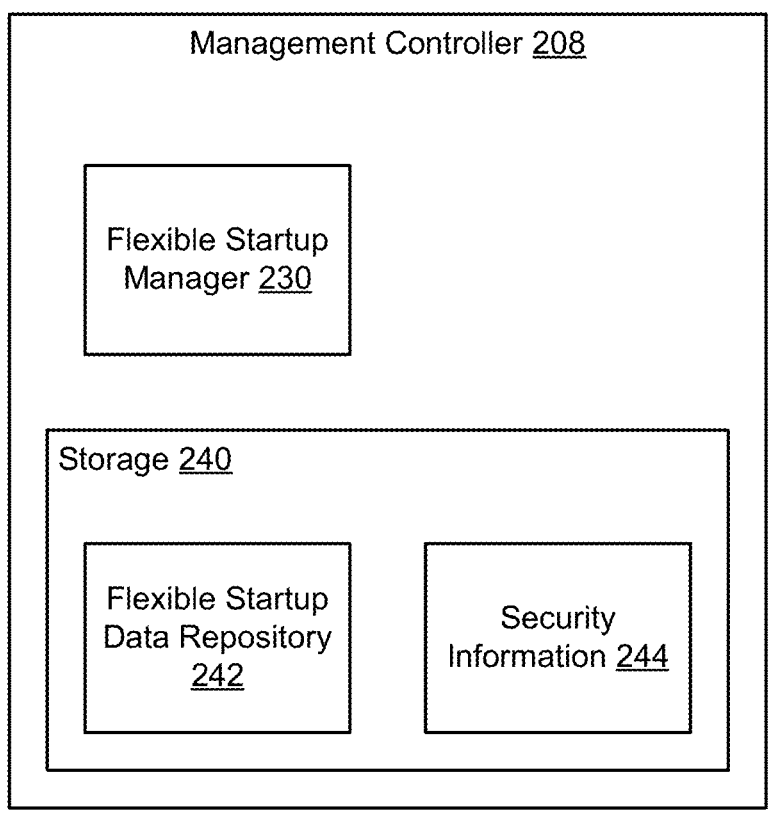
FIG. 2B shows a block diagram illustrating a management controller in accordance with an embodiment.

For additional details regarding management controller 208, refer to FIG. 2B and the corresponding discussion.

When providing its functionality, management controller 208 may perform all, or a portion, of the methods illustrated in FIGS. 3A-3B.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 220 is implemented with secured storage 222. Secured storage 222 may include a hardware storage device for storing data. Access to secured storage 222 may be limited. For example, secured storage 222 may be implemented with a solid state storage device operably connected via a serial peripheral interface bus to a processor of data processing system 200. Upon startup, data processing system 200 may cause the information in the solid state storage device to be used to perform startup of data processing system 200. For example, instructions (e.g., computer code) corresponding to startup manager 210 may be stored in startup data 224 and/or cryptographic data usable to validate the instructions may be stored in startup data 224. The contents of the solid state storage device may be generally inaccessible without providing various credentials such as passwords.

Startup data 224 may include any type and quantity of data for performing any number and type of startups of data processing system 200. These startups may be secured startups by virtue of the secure storage and cryptographic data for.

In an embodiment, storage 220 is implemented with general storage 226. General storage 226 may include any number and types of storage devices. General storage 226 may be generally accessible. For example, operation manager 202 may manage and provide access to data stored in general storage 226.

Application data 228 may include any type and quantity of data used by applications 204 to provide their respective services.

While illustrated in FIG. 2A as including a limited number of specific components, a data processing system in accordance with an embodiment may include fewer, additional, and/or different components than shown herein.

Turning to FIG. 2B, a diagram of management controller 208 in accordance with an embodiment is shown. As discussed above, management controller 208 may provide startup management service. To provide its functionality, management controller 208 may include flexible startup manager 230 and storage 240. Each of these components is discussed below.

Flexible startup manager 230 may cooperate in startups performed by a host data processing system. To do so, flexible startup manager 230 may (i) provide security information 244 to the host data processing system during startup, and (ii) provide data from flexible startup data repository 242 requested during by the host data processing system during the startup. By doing so, the host data processing system may obtain code (e.g., non-UEFI firmware, management entity images, etc.) and validate the code, or portions thereof, as part of flexible startup processes.

In an embodiment, flexible startup manager 230 is implemented using a hardware device including circuitry. The hardware device may be, for example, a digital signal processor, a field programmable gate array, or an application specific integrated circuit. The circuitry may be adapted to cause the hardware device to perform the functionality of flexible startup manager 230. Flexible startup manager 230 may be implemented using other types of hardware devices without departing from embodiments disclosed herein.

In an embodiment, flexible startup manager 230 is implemented using a processor adapted to execute computing code stored on a persistent storage that when executed by the processor performs the functionality of flexible startup manager 230 discussed throughout this application. The processor may be a hardware processor including circuitry such as, for example, a central processing unit or a microcontroller. The processor may be other types of hardware devices for processing digital information without departing from embodiments disclosed herein.

When providing its functionalities, flexible startup manager 230 may perform all, or a portion, of the methods illustrated in FIGS. 3A-3B.

In an embodiment, storage 240 is implemented using physical devices that provide data storage services (e.g., storing data and providing copies of previously stored data). The devices that provide data storage services may include hardware devices and/or logical devices. For example, storage 240 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 240 may include a memory device (e.g., a dual in line memory device) in which data is stored and from which copies of previously stored data are provided. In another example, storage 240 may include a persistent storage device (e.g., a solid-state disk drive) in which data is stored and from which copies of previously stored data is provided. In a still further example, storage 240 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 240 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 240 may store data structures including flexible startup data repository 242 and security information 244. Each of these data structures is discussed below.

Flexible startup data repository 242 may include one or more data structures that include information usable to complete a flexible startup of a data processing systems. For example, flexible startup data repository 242 may include (i) non-UEFI firmware, (ii) images of management entities such as a non-UEFI boot image, and/or (iii) information usable to obtain the non-UEFI firmware and/or other data structures from other entities (e.g., remote storage locations).

Security information 244 may include one or more data structures that include security information usable to validate data structures of flexible startup data repository 242. For example, security information 244 may include one or more hash values (e.g., also referred to as a "hash") calculated using a hash function (e.g., Secure Hash Algorithm 2 (SHA-2) or other types of functions that may intake a digest and output a hash value) based on one or more of the data structures of flexible startup data repository. The hash values may include a hash value corresponding to the non-UEFI firmware/image of flexible startup data repository 242.

The data structures stored in storage 240 may be implemented using, for example, lists, tables, unstructured data, trees, databases, etc. While illustrated in FIG. 2B as being stored locally, the data structures may be stored remotely and may be distributed across any number of devices without departing from embodiments disclosed herein.

While illustrated in FIG. 2B as including a limited number of specific components, a management controller in accordance with an embodiment may include fewer, additional, and/or different components than shown herein.

Figure 2C:
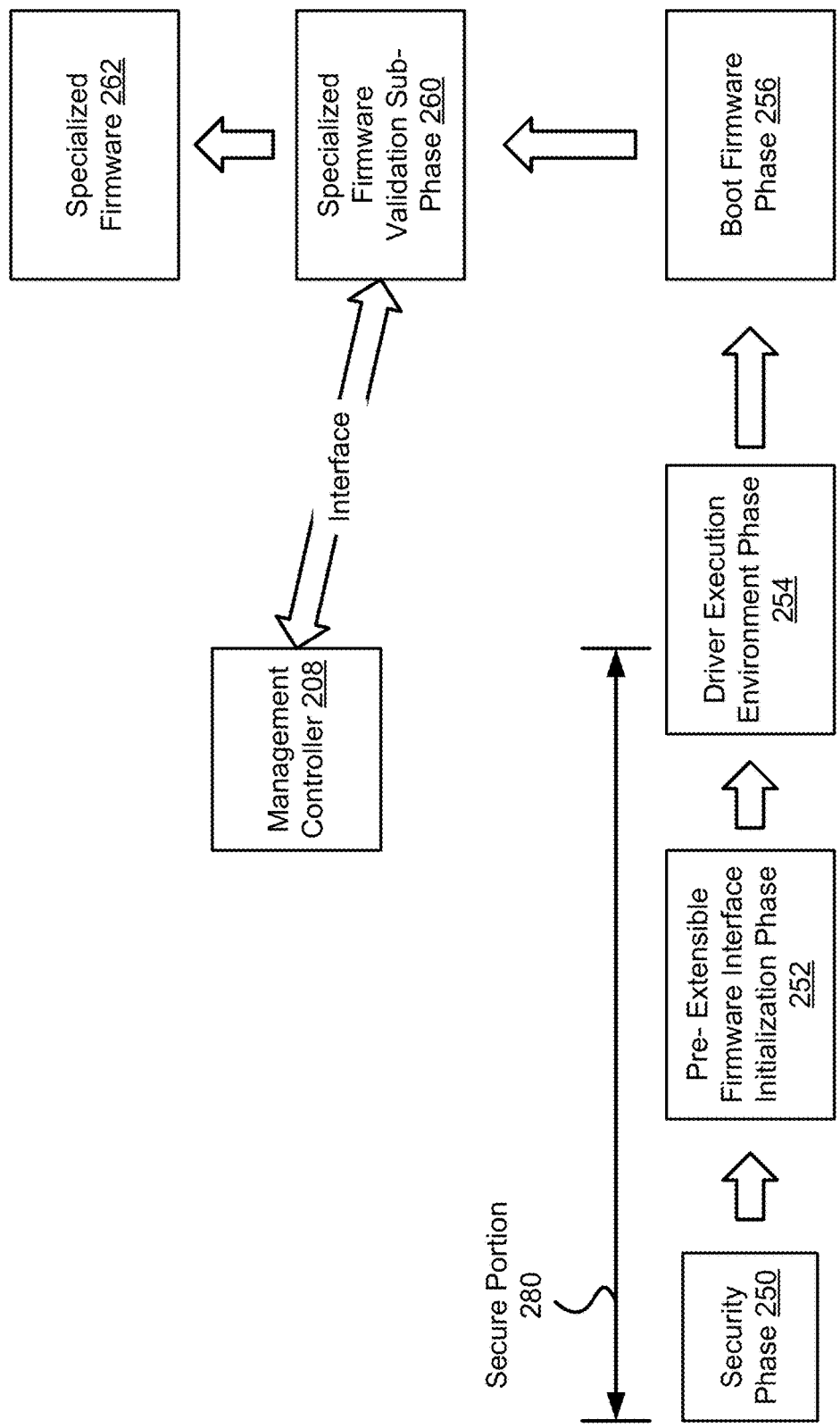
FIGS. 2C-D show diagram illustrating a startup process for a data processing system in accordance with an embodiment.
Figure 2D:
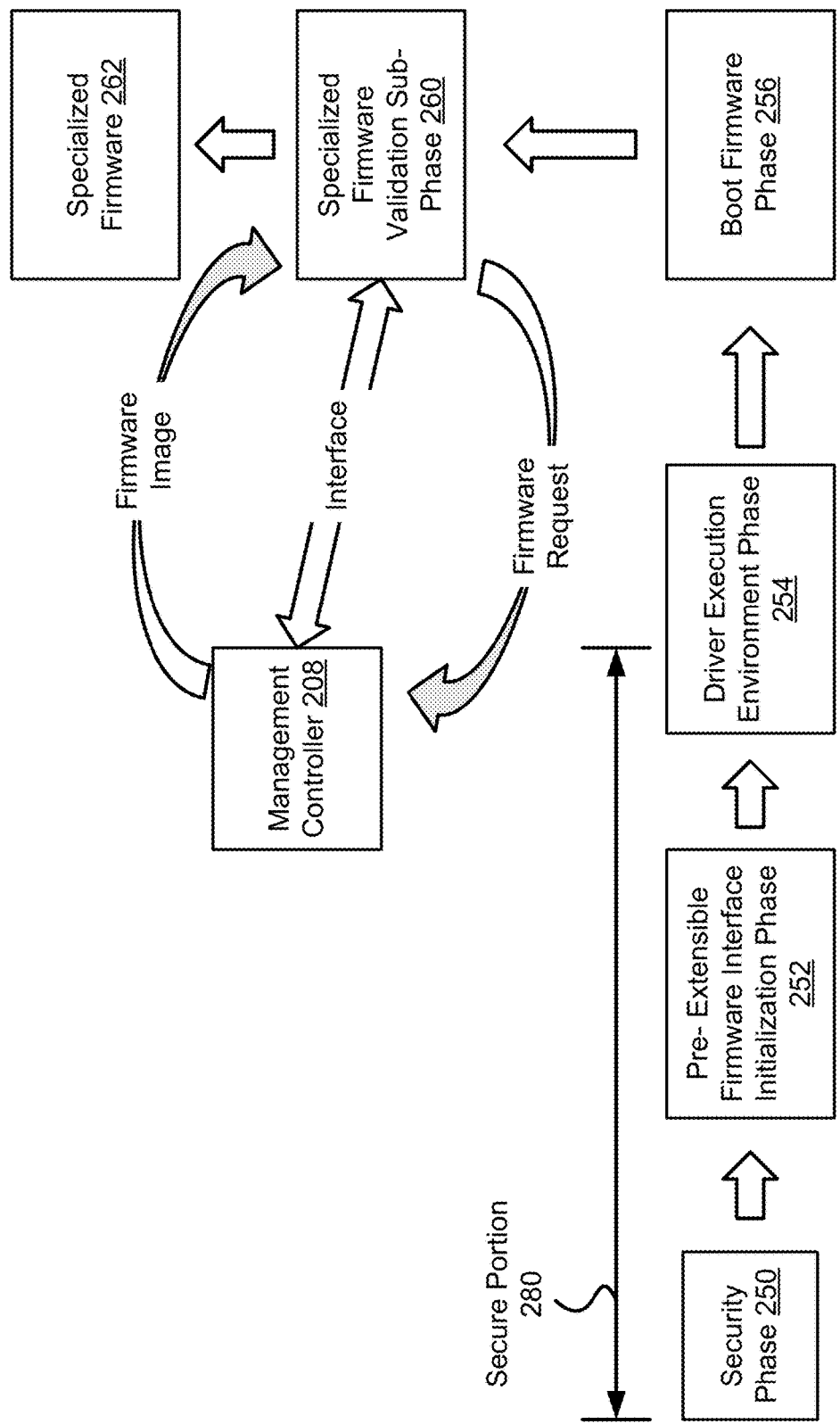

As discussed above, data processing systems may include functionality to perform flexible startups that may be secured through both validation and limitations on interface made available during the startups. FIGS. 2C-2D show diagrams illustrating a flexible startup in accordance with an embodiment.

Turning to FIG. 2C, a startup manager of a data processing systems may orchestrate performance of various phases 250, 252, 254, 256, 260 of a flexible startup until handoff to a management entity. For example, after a UEFI compliant startup manager completes a POST, the UEFI compliant startup manager may ascertain whether the startup being performed is UEFI compliant. If the startup is not a UEFI compliant startup, then the UEFI compliant startup manager may use an interface to management controller 208 to obtain a copy of non-UEFI compliant firmware and/or other portions of code usable to complete the non-UEFI compliant startup.

Generally, the flexible startup may include secure portion 280 and an unsecured portion following the securing portion. Secure portion 280 of the flexible startup may include security phase 250, pre-extensible firmware interface initialization (PEI) phase 252, and some of driver execution environment (DXE) phase 254 prior to execution of any third party code, such as the non-UEFI compliant firmware or other portions of code that may not be stored in secure storage.

To secure the flexible startup, during secure portion 280 which may end upon completion of the POST, the startup manager may limit the types of interfaces that may be established. For example, the startup manager may prevent USB interfaces from being established thereby limiting risk of malicious code being accessed through the USB interfaces. Additionally, to obtain the non-UEFI compliant firmware, the startup manager may establish an interface to management controller 208 which may present a much lower level of risk to the startup.

Additionally, the startup manager may obtain security information from management controller 208. The security information may allow for the validity of copies of non-UEFI firmware alleged to be valid to be validated.

For example, management controller 208 may provide the security information in response to a security information request. The security information may include a hash value for a non-UEFI firmware (or other code base or portion of code) that will be used to complete the flexible startup. The security information may be stored in memory for use during subsequent phases of the flexible startup.

When the startup enters DXE phase 254, the startup manager may, in the case of a flexible startup, generally not load firmware (e.g., drivers) as would be expected during a startup in compliance with the UEFI specification. Rather, the flexible startup may move to a boot firmware phase 256 in which non-UEFI compliant firmware may be attempted to be loaded. The non-UEFI compliant firmware may support execution of a non-UEFI compliant management entity (e.g., a Linux distribution).

As part of boot firmware phase 256, a specialized firmware validation sub-phase 260 may be performed. Turning to FIG. 2D, as part of specialized firmware validation sub-phase 260, a firmware image (e.g., non-UEFI compliant firmware) may be obtained from management controller 208 via the bare metal interface, and stored in memory. Once stored in memory, security information for the specialized firmware may be obtained using the process through which the security information provided by management controller 208 was performed. For example, if the previously obtained security information is a hash value calculated using a hash function with the specialized firmware as a digest, then startup manager may calculate a hash value using the same hash function with the newly obtained copy of the firmware image as the digest to obtain security information for the newly obtained copy of the firmware image.

The previously obtained security information and newly obtained security information may be compared. If they match, then firmware image may be treated as having been validated, and may be loaded into memory and executed. Otherwise, the newly obtained copy of the firmware image may be treated as not being valid. If not treated as being valid, then the firmware image may be discarded and/or handling procedures may be implemented to remediate the flexible startup. Executing the firmware image may give rise to an instance of specialized firmware 262, which may not comply with the UEFI specification.

Use of hash values for validation of code bases used during flexible startups may provide computational efficiency for the validations (e.g., in contrast to validation processes that may rely on signatures, certificates, and/or other types of cryptographic data) and a high level of security for the flexible startups.

As discussed above, the components of FIG. 1 may perform various methods to increase the likelihood of data processing systems being able to enter predetermined manners of operation. FIGS. 3A-3B illustrate examples of methods that may be performed by the components of FIG. 1. In the diagrams discussed below and shown in these figures, any of the operations may be repeated, performed in different orders, and/or performed in parallel with or a partially overlapping in time manner with other operations.

Turning to FIG. 3A, a flow diagram illustrating a method of performing a startup of a data processing system in accordance with an embodiment is shown. The method may be performed, for example, by a data processing system, a startup manager, and/or other components illustrated in FIGS. 1-2D.

At operation 300, completion of a POST portion of a startup is identified by a UEFI compliant startup manager. The completion may be identified, for example, by performing of all of the actions in a plan for the startup to place the data processing system in condition to complete a UEFI compliant startup. To reduce system vulnerability, the UEFI compliant startup manager may have prevented emulated or native USB interfaces from being launched, but may have allowed high speed interfaces to a hosted management controller to be instantiated. In contrast to USB or other types of interfaces through which external media may be added to a data processing system, the high speed interface to the management controller may be present less risk because it may be unlikely that malicious code may be introduced though this interfaces.

At operation 302, a determination is made regarding whether the startup is a UEFI compliant startup. The determination may be made by (i) obtaining user input indicating the type of the startup (e.g., a user of the data processing system), (ii) reading stored data such as flags or other data indicating the type of the startup (e.g., a user may set a default startup to be a flexible or secure startup), and/or (iii) via other processes. A UEFI compliant startup is a startup in which the startup complies with the UEFI specification, which may include leading of UEFI compliant firmware after the POST. In contrast, a non-UEFI compliant startup may be a startup in which non-UEFI firmware is loaded following a post. The non-UEFI firmware may, for example, perform functions similar to drivers or other firmware loaded during a portion of a UEFI compliant startup.

If it is determined that the startup is a UEFI compliant startup, then the method may proceed to operation 306 following operation 302. Otherwise, the method may proceed to operation 312 following operation 312.

At operation 306, a non-UEFI compliant firmware image is obtained from a management controller. The non-UEFI firmware may be relied upon by a management entity to which operation of the data processing system is handed off through the non-UEFI compliant startup. The non-UEFI compliant firmware image may be obtained while USB interfaces (native and/or emulated) are unavailable.

The non-UEFI compliant firmware image may be obtained via the method illustrated in FIG. 3B.

At operation 308, a determination is made regarding whether the non-UEFI compliant firmware image is trustworthy. The determination may be made by comparing previously obtained security information (e.g., a hash value) and complementary security information (e.g., another hash value) to determine if they are the same. If they are the same, then it may be determined that the non-UEFI compliant firmware image is trustworthy.

The complementary security information may be obtained using the non-UEFI compliant firmware image. The complementary security information may be obtained using a similar process through which the security information was obtained, and may use the non-UEFI compliant firmware image (e.g., in memory) as a digest (e.g., in the case that the process is through use of a hash function such as SHA-2). The complementary security information may be a hash value, and the process may be the same hash function through which the security information was obtained. The hash function may be collision free, or may be of sufficiently low collision that matching hash values generated by the hash function may indicate that a same digest was used as input to the hash function to obtain the matching hash values.

At operation 310, management of the flexible startup is handed off to an instance of the non-UEFI compliant firmware using the non-UEFI compliant image to complete the startup. Management of the flexible startup may be handed off to the non-UEFI compliant firmware by initiating execution of the non-UEFI compliant firmware.

For example, initiating execution of the non-UEFI firmware image may begin operation of a kernel and runtime environment to support operation of a management entity. These components may replace the functionality of various firmware drivers that may begin to execute as part of UEFI firmware during a secure startup, in contrast to that performed during a flexible startup that is non-UEFI compliant. Thus, the flexible startup may place the data processing system in a mode of operation that is different from that which would be obtained through use of UEFI firmware during a secure startup.

Following handoff, the non-UEFI compliant firmware may complete the rest of the flexible startup (e.g., independently from or in cooperation with a UEFI compliant startup manager that orchestrated the flexible startup prior to handoff of management of the flexible startup).

The method may end following operation 310.

Returning to operation 308, the method may proceed to operation 314 if the non-UEFI compliant firmware is not trustworthy.

At operation 314, the flexible startup is remediated. The flexible startup may be remediated by performing one or more of: (i) displaying an error (e.g., indicating that the flexible startup cannot be completed), (ii) halting the flexible startup, (iii) performing a recovery (e.g., by initiating execution of other firmware which may be trusted/validated and/or entering a recovery phase of a startup), and/or (iv) performing other actions to place the data processing system into a desired mode of operation without use of the non-UEFI compliant firmware image.

The method may end following operation 314.

Returning to operation 302, the method may proceed to operation 312 if the startup is a UEFI compliant startup.

At operation 312, UEFI compliant firmware is obtained, loaded into memory, and/or executed. The UEFI compliant firmware may be obtained, for example, from secure storage or another trusted source. The UEFI compliant firmware may be obtained from other locations, but may be validated prior to use. Initiating execution of the UEFI compliant firmware may place the data processing system in condition for to handoff to a management entity (e.g., which may be UEFI compliant).

The method may end following operation 312.

Using the method illustrated in FIG. 3A, a flexible startup may be performed in a manner that reduces risk from exposure to interfaces such as USB interfaces while allowing for flexibility in use of various code bases which may be stored outside of secure storage.

Turning to FIG. 3B, a flow diagram illustrating a method of obtaining non-UEFI compliant firmware in accordance with an embodiment is shown. The method may be performed, for example, by a data processing system, a startup manager, and/or other components illustrated in FIGS. 1-2D.

At operation 320, a request for a non-UEFI compliant firmware image is provided to a management controller hosted by a data processing system that is performing a flexible startup. The request may be provided using a communication protocol (e.g., SMA, a memory mapped management controller interface) compliant command for a communication protocol implemented by the data processing system and management controller. The request may be sent over a bare metal interface, and may be sent while other interfaces such as USB interfaces are inoperable or are otherwise unavailable.

At operation 322, the non-UEFI compliant firmware image is obtained from the management controller via a response to the request. The non-UEFI compliant firmware image may be part of the response, and may be obtained by extracting it from the response. The non-UEFI compliant firmware image may include, for example, firmware usable to complete a non-UEFI compliant startup.

The response may also include, for example, information regarding a process previously performed to obtain the security information. For example, the response may specify a type of hash function used to obtain a hash value for the non-UEFI compliant firmware image.

The method may end following operation 322.

Figure 4:
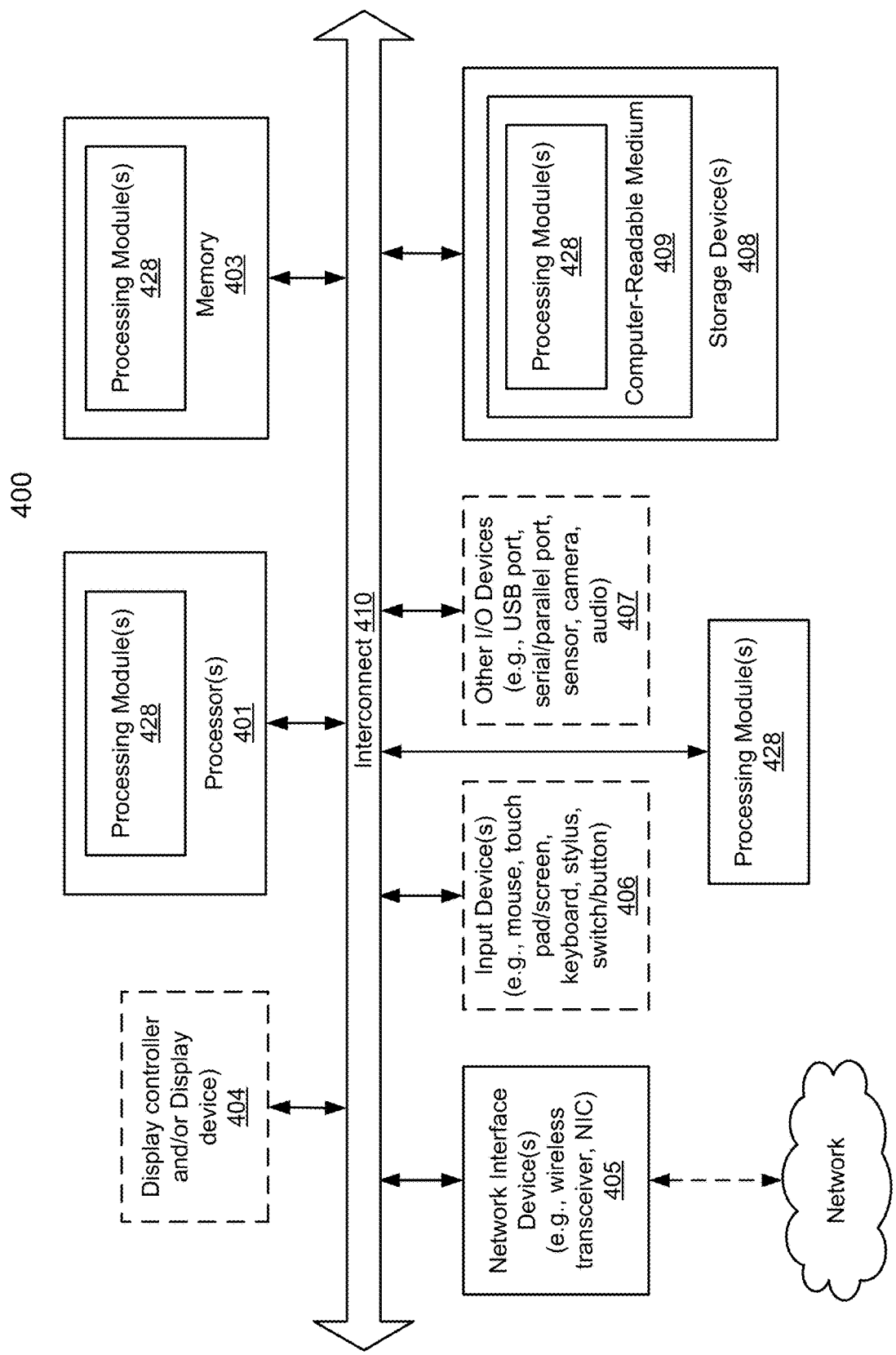
FIG. 4 shows a block diagram illustrating a computing device in accordance with an embodiment.

Any of the components illustrated in FIGS. 1-2D may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft °, Mac OS®/iOS® from Apple, Android® from Google Linux Unix °, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing operation of a data processing system, the method comprising:
   identifying a startup of the data processing system;
   after a unified extensible firmware interface (UEFI) compliant startup manager finishes a power-on self-test (POST) portion of the startup:
      making a determination regarding whether the startup is a UEFI compliant startup;
      in an instance of the determination in which the startup is not a UEFI compliant startup:
         obtaining a non-UEFI compliant firmware image from a management controller hosted by the data processing system;
         making a second determination regarding whether the non-UEFI compliant firmware image is trustworthy; and
         in a first instance of the second determination in which the non-UEFI compliant firmware image is trustworthy:
            handing off management of the startup to an instance of a non-UEFI compliant firmware hosted by the data processing system using the non-UEFI compliant firmware image to complete the startup; and
         in a second instance of the second determination in which the non-UEFI compliant firmware image is not trustworthy:
            remediating the startup without using the non-UEFI compliant firmware image to complete the startup.

2. The computer-implemented method of claim 1, wherein obtaining the non-UEFI compliant firmware image from the management controller comprises:
   sending a request for the non-UEFI compliant firmware image to the management controller via a high speed bare metal interface; and
   receiving a copy of the non-UEFI compliant firmware image via a message responsive to the request and obtained via the high speed bare metal interface.

3. The computer-implemented method of claim 2, wherein the high speed bare metal interface is a shared memory architecture (SMA) or a memory mapped management controller interface.

4. The computer-implemented method of claim 3, wherein the non-UEFI compliant firmware image is executed prior to any operating systems being executed by the data processing system.

5. The computer-implemented method of claim 2, wherein the high speed bare metal interface is implemented without emulation.

6. The computer-implemented method of claim 5, wherein the non-UEFI compliant firmware image is executed prior to any operating systems being executed by the data processing system.

7. The computer-implemented method of claim 1, further comprising:
in a second instance of the determination in which the startup is a UEFI compliant startup:
obtaining UEFI compliant firmware; and
initiating execution of the UEFI compliant firmware during the startup.

8. The computer-implemented method of claim 1, wherein the second determination is made using security information corresponding to the non-UEFI compliant firmware image and by, at least in part, performance of an operation using the non-UEFI compliant firmware image, the operation having been used to obtain the security information.

9. The computer-implemented method of claim 1, wherein remediating the startup comprises at least one action selected from a group of actions consisting of:
halting the startup;
displaying an error with respect to the startup; and
performing a recovery for the data processing system.

10. The computer-implemented method of claim 1, wherein the management controller operates independently from hardware components of the data processing system used to provide computer implemented offered by the data processing system.

11. A non-transitory machine-readable medium having instructions stored therein, which when executed by a processor, cause a data processing system to perform operations, the operations comprising:
identifying a startup of the data processing system;
after a unified extensible firmware interface (UEFI) compliant startup manager hosted by the data processing system finishes a power-on self-test (POST) portion of the startup:
making a determination regarding whether the startup is a UEFI compliant startup;
in an instance of the determination in which the startup is not a UEFI compliant startup:
obtaining a non-UEFI compliant firmware image from a management controller hosted by the data processing system;
making a second determination regarding whether the non-UEFI compliant firmware image is trustworthy; and
in a first instance of the second determination in which the non-UEFI compliant firmware image is trustworthy:
handing off management of the startup to an instance of a non-UEFI compliant firmware hosted by the data processing system using the non-UEFI compliant firmware image to complete the startup; and
in a second instance of the second determination in which the non-UEFI compliant firmware image is not trustworthy:
remediating the startup without using the non-UEFI compliant firmware image to complete the startup.

12. The non-transitory machine-readable medium of claim 11, wherein obtaining the non-UEFI compliant firmware image from the management controller comprises:
sending a request for the non-UEFI compliant firmware image to the management controller via a high speed bare metal interface; and
receiving a copy of the non-UEFI compliant firmware image via a message responsive to the request and obtained via the high speed bare metal interface.

13. The non-transitory machine-readable medium of claim 12, wherein the high speed bare metal interface is a shared memory architecture (SMA) or a memory mapped management controller interface.

14. The non-transitory machine-readable medium of claim 13, wherein the non-UEFI compliant firmware image is executed prior to any operating systems being executed by the data processing system.

15. The non-transitory machine-readable medium of claim 12, wherein the high speed bare metal interface is implemented without emulation.

16. A data processing system, comprising:
a management controller;
a processor; and
a memory coupled to the processor to store instructions, which when executed by the processor, cause the processor to perform operations, the operations comprising:
identifying a startup of the data processing system;
after a unified extensible firmware interface (UEFI) compliant startup manager hosted by the data processing system finishes a power-on self-test (POST) portion of the startup:
making a determination regarding whether the startup is a UEFI compliant startup;
in an instance of the determination in which the startup is not a UEFI compliant startup:
obtaining a non-UEFI compliant firmware image from a management controller hosted by the data processing system;
making a second determination regarding whether the non-UEFI compliant firmware image is trustworthy; and
in a first instance of the second determination in which the non-UEFI compliant firmware image is trustworthy:
handing off management of the startup to an instance of a non-UEFI compliant firmware hosted by the data processing system using the non-UEFI compliant firmware image to complete the startup; and
in a second instance of the second determination in which the non-UEFI compliant firmware image is not trustworthy:
remediating the startup without using the non-UEFI compliant firmware image to complete the startup.

17. The data processing system of claim 16, wherein obtaining the non-UEFI compliant firmware image from the management controller comprises:
sending a request for the non-UEFI compliant firmware image to the management controller via a high speed bare metal interface; and receiving a copy of the non-UEFI compliant firmware image via a message responsive to the request and obtained via the high speed bare metal interface.

18. The data processing system of claim 17, wherein the high speed bare metal interface is a shared memory architecture (SMA) or a memory mapped management controller interface.

19. The data processing system of claim 18, wherein the non-UEFI compliant firmware image is executed prior to any operating systems being executed by the data processing system.

20. The data processing system of claim 17, wherein the high speed bare metal interface is implemented without emulation.

* * * * *